Dec. 12, 1972  J. M. MORRIS ET AL  3,706,018
ELECTROMAGNETIC VIBRATOR EMPLOYING RECTIFICATION
OF INDUCED CURRENTS
Filed Nov. 4, 1971

United States Patent Office 3,706,018
Patented Dec. 12, 1972

3,706,018
ELECTROMAGNETIC VIBRATOR EMPLOYING
RECTIFICATION OF INDUCED CURRENTS
John M. Morris and Preston H. Schrader, Louisville, Ky.,
assignors to Rex Chainbelt Inc., Milwaukee, Wis.
Filed Nov. 4, 1971, Ser. No. 195,746
Int. Cl. H02k 33/08
U.S. Cl. 318—125
4 Claims

ABSTRACT OF THE DISCLOSURE

The motor of an electromagnetic vibrator comprises a ferromagnetic core arranged with windings energized with alternating current and direct current, in which the direct current excitation preferably exceeds the alternating current excitation. The direct current for a winding may be supplied from the power line through rectifiers or may be induced in the winding, closed by a unilateral conductor, by transformer action from another winding energized with alternating current. Since the force of an electromagnet varies as the square of the flux across the air gap, the presence of the direct current field increases the effectiveness of the alternating current in driving the vibrator.

BACKGROUND OF THE INVENTION

Electromagnetic vibrators have been in extensive use, primarily in apparatus such as vibratory feeders operating at line frequency or at double line frequency. These motors are invariably operated with small air gaps and at short strokes. The small air gaps have been considered necessary for reasonably efficient operation.

SUMMARY OF THE INVENTION

According to the invention, the efficiency of the power transfer in an electromagnetic vibrator motor is increased by adding a direct current magnetic flux, preferably greater than the peak alternating current magnetic flux, to the alternating current flux in the magnetic circuit of the motor. The direct current flux source may be a winding supplied with direct current or rectified alternating current. Optionally the direct current flux may be obtained by connecting a rectifier across a winding on the magnetic circuit. The magnetic circuit may be arranged to provide force in one direction only, or to provide a drive force in each direction in each cycle of the mechanical vibration.

DESCRIPTION OF THE PREFERRED EMBODIMENTS

Figure 1:
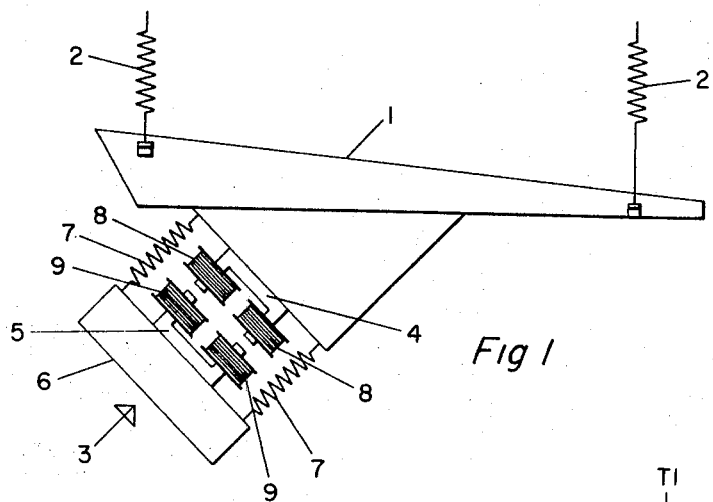
FIG. 1 is a simplified side elevation of a typical vibratory feeder employing a motor constructed according to the invention.

As schematically illustrated in FIG. 1, a vibratory feeder according to the invention comprises a feeder trough 1 supported on vibration isolating springs 2 and driven by an electromagnetic drive motor 3.

The electromagnetic drive motor 3 comprises a first laminated iron U-shaped core 4 mounted on the feeder trough and a second core 5 mounted in an exciter weight 6 that is coupled to the trough through coupling springs 7. The spring rate of the coupling springs is selected so that the vibrating system comprising the trough as one mass, the exciter as a second mass, and the springs is resonant at a frequency slightly higher than the operating frequency.

Figure 2:
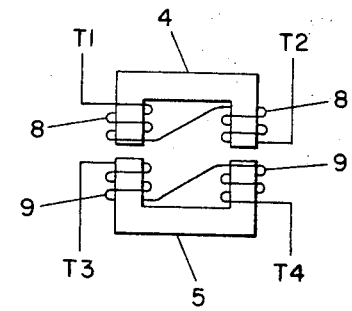
FIG. 2 is a schematic diagram of one form of magnetic circuit that may be employed.

The cores 4 and 5 are provided with windings 8 and 9. Preferably, the windings are distributed some on one core and some on the other although all the windings may be located on one core. In the preferred arrangement, as shown in FIG. 2, the windings 8 are divided into two sections or coils, one on each leg of the U-shaped core 4 to facilitate manufacture and assembly. The windings 9 are similarly arranged on the core 5. According to the invention the windings are energized to provide a steady state flux threading the cores plus a superimposed alternating flux such that the total flux varies between a substantial minimum and a maximum that may be near the saturation level for the iron cores.

Several circuit arrangements may be used to energize the electromagnets from an alternating current power line. In the first arrangement, shown in FIG. 3, current from a power lead $L_1$, connected to coil terminal T1, flows through coil 8 to terminal T2. From coil terminal T2 the current flows through a full wave diode bridge rectifier comprising diodes D1, D2, D3 and D4 and coil 9 to the return power lead L2. Thus the line current, without rectification flows through the coil 8, and the same current, after rectification, flows through the coil 9. If the coils have the same number of turns and neglecting mutual inductance, the total magnetomotive force varies from zero when the currents in the coils oppose each other to a maximum when the coils aid each other.

In the actual vibrator motor the flux from each coil threads through the other coil producing a mutual inductance. Thus a voltage is generated in each coil depending upon the rate of change of flux resulting from a varying current in the other coil. If a coil on the core is short circuited (its terminals connected together) a current flows in the coil opposing any change in flux through the coil. The diode bridge in addition to rectifying the line current acts as a switch to short the coil 9 during induced current flow in one direction and open the coil to prevent any reverse induced current flow.

This allows the flux in the coil 9 to change rapidly in one direction but slowly in the opposite direction and a resulting substantial direct current to flow in the coil and rectifier bridge in addition to the rectified line current. With equal coils on the cores, the direct current component of the induced current flow in coil 9 is substantially greater than the rectified line current component. This substantial increase in the direct current component and resulting magnetic flux materially increases the efficiency of the drive motor.

Figure 3:
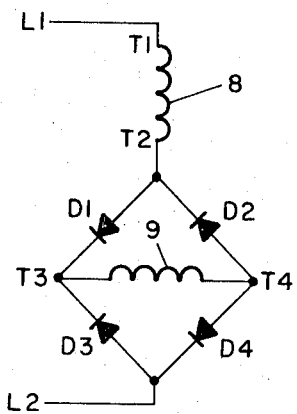
FIG. 3 is a circuit diagram of one arrangement for connecting the windings to a source of power.

It was discovered that removal of one of the diodes of the diode bridge increased the power of the drive motor. This effect is attributed to the resulting direct current component of flux in the coil 8. It may be noted that removal of diode D2 of the bridge circuit shown in FIG. 3 results in the circuit shown in FIG. 4. With reference to FIGS. 2 and 3, the core 5 with coil 9 at full power is magnetized near saturation while the core 4 with coil 8 carries an alternating flux so that the total flux across the air gap, and thus the mechanical force, varies above and below the flux provided by the core 5. However, when a diode is removed and the circuit corresponds to that shown in FIG. 4, the coil 8 on core 4 carries half wave rectified current instead of alternating current. As a result the variation in flux is less but the total flux is greater and the actual power output increased.

Figure 4:
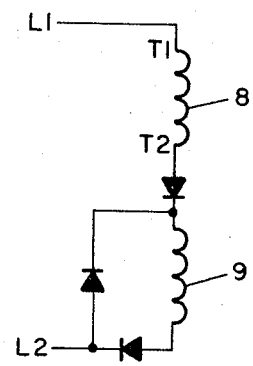
FIGS. 4 and 5 are circuit diagrams of other arrangements of connecting the windings according to the invention.
Figure 5:
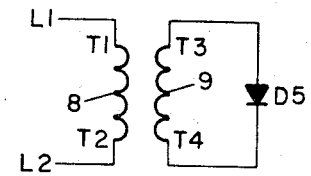

Since the major part of the direct current flow in the coil 9 results from the induced current, the rectifier bridge 10 may be omitted, the coil 8 connected directly to the power line, and the coil 9 closed through a diode D5, all as shown in FIG. 5. The performance of the motor when so connected is practically the same as when connected according to FIG. 3 or 4. In any of these arrangements the performance of the motor is superior to the performance when conventionally connected, i.e. with a diode in series with the power line feeding the motor.

Figure 6:
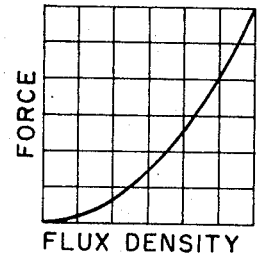
FIG. 6 is a graph to show the relationship between the mechanical force developed by the motor and the density of the magnetic flux in the air gaps.

The power delivered by an electromagnetic motor of the type used to drive a vibrator depends upon the difference between the force exerted by the magnet as the air gap is closing and the force when the gap is opening. When the gap is closing the magnetic force is generally in phase with the relative velocity between the members and energy is delivered to the vibrating system. When the gap is opening, the magnetic force is out of phase with the velocity and energy is returned from the mechanical system to the electrical system. The net energy flow per cycle is thus proportional to the difference between the force exerted while the gap is closing and the force exerted as it is opening. It is also well known, as illustrated in FIG. 6, that the force exerted across an air gap varies as the square of the flux density. It therefore follows that for a given change in flux density the resulting change in mechanical force is proportional to the average flux density. The conventional arrangement of electromagnetic motor usually operates on the lower part of the curve. In the arrangements just described the excess direct current component raises the average flux density so that the operation is along the upper part of the curve where comparatively greater force variations are obtained for a given change in magnetic flux.

Figure 7:
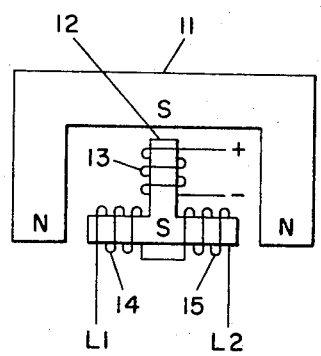
FIG. 7 is a schematic diagram of an electromagnetic drive adapted to operate in both directions, i.e. at both ends of the mechanical stroke.

Most electromagnetic vibrators operate in one direction only. The principles of the invention may be employed in an electromagnetic motor constructed according to FIG. 7. In this arrangement a U-shaped core or armature 11 cooperates with a T-shaped core 12 carrying a plurality of coils or windings 13, 14, 15. The T-shaped core 12 is oriented with the stem of the T adjacent the middle of the U of the core 11 and with the cross bar of the T extending along a line between the ends of the legs of the U-shaped core 11 and separated from such ends by air gaps. The relative vibratory motion is along the line of the bar of the T.

In this arrangement the coil 13 on the stem of the T is energized with direct or rectified current to provide a D.C. component of flux that threads the coil 13, crosses the gap to the middle of the U-shaped core, then divides with each part following a part of the U-shaped core and returning across the air gaps and adjacent portion of the cross bar of the T-shaped core 12. This is the flux to provide operation along the upper portion of the curve of FIG. 6.

The alternating component of flux, which either adds to or subtracts from the D.C. component varies the flux density in the air gaps, with the flux density in one gap increasing while the flux in the other decreases.

The alternating flux component is provided by current flow in the windings 14 and 15 which are arranged with the same polarity, i.e. both coils, whether in series or in parallel, produce flux in the same direction along the bar of the T-shaped core. The coils 14 and 15 are connected to carry alternating current such as the coil 8 in FIG. 3, while the coil or winding 13 is supplied through a rectifier in the same manner as the coil 9 in FIG. 3.

In this arrangement power is supplied from the magnet to the vibrating system as the vibrating members approach each end of their vibratory strokes. Thus it is possible to double the energy input to the vibrating system.

In the foregoing arrangements no means to control the power to the motor is shown. Control may be readily provided by using a variable ratio transformer between the power line and the motor windings.

Figure 8:
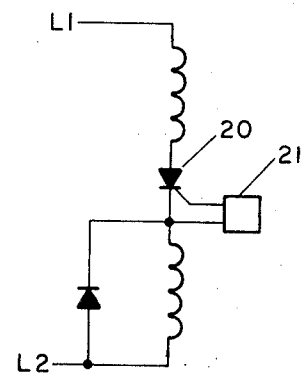
FIG. 8 is a schematic diagram of a control similar to FIG. 4 arranged to vary the power drawn from the line to vary the amplitude of vibration.

Control may also be obtained by replacing the series diode shown in FIG. 4 with an SCR 20 as shown in FIG. 8. By selecting the time that the SCR is "fired" in each power cycle the effective voltage and current flow in the windings may be easily controlled. This circuit may also be operated satisfactorily at half the frequency of the power line by tuning the vibrating system for resonance at a frequency slightly greater than half the power line frequency and arranging a firing control 21 to supply triggering current to the SCR 20 at a selected time in every other cycle of the power line voltage. The control 21 may be a half wave version of a conventional "ramp and pedestal" type of control as shown in section 8.4.2 of the General Electric SCR Manual, 3rd edition, combined with a simple divide by two counter that is triggered by the line voltage and connected to suppress every other cycle of the timing circuit.

In each of the several arrangements advantage is taken of a D.C. component of magnetic flux to increase the force developed by the A.C. component of flux and thus increase the power output of the electromagnetic vibrator motor.

We claim:
1. In an electromagnetic vibrator, a first member, a second member, resilient means connecting the members to form a vibratory system, a ferromagnetic circuit having a portion on each of the members, at least two windings on said ferromagnetic circuit, means for conducting current from an alternating current power source through at least one of the windings to supply at least half wave current to said winding, and a rectifier connected in parallel with another of said windings arranged to pass current in response to voltage generated in such winding by mutual coupling to the winding carrying current from the alternating power source.

2. An electromagnetic vibrator according to claim 1 in which power line current flow through at least two windings in said ferromagnetic circuit.

3. An electromagnetic vibrator according to claim 1 in which the rectifier and associated winding are insulated from the other winding or windings.

4. An electromagnetic vibrator according to claim 1 in which the ferromagnetic circuit is divided into two branches, a winding coupled to both branches, a rectifier connected to said winding, and a second winding coupled to each of said branches to vary the flux distribution between said branches.

References Cited
UNITED STATES PATENTS

| | | | |
|---|---|---|---|
| 2,789,237 | 4/1957 | Efromson | 310—27 |
| 2,862,164 | 11/1958 | Kuhner | 318—132 |
| 2,930,871 | 3/1960 | Fleming | 310—27 X |
| 2,425,621 | 8/1947 | Knipper | 310—27 |
| 2,568,757 | 9/1951 | Mesh | 310—29 X |
| 3,106,653 | 10/1963 | Fowler | 310—27 |
| 2,305,943 | 12/1942 | Weyandt | 310—29 |
| 2,481,131 | 9/1949 | Lindsay | 310—29 |

JOSEPH V. TRUHE, Primary Examiner

B. A. REYNOLDS, Assistant Examiner

U.S. Cl. X.R.

310—27, 29; 318—132